US007924386B2

(12) United States Patent
Lee

(10) Patent No.: US 7,924,386 B2
(45) Date of Patent: Apr. 12, 2011

(54) LIQUID CRYSTAL DISPLAY DEVICE AND DRIVING METHOD FOR FABRICATING THE SAME

(75) Inventor: Sang Yeup Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 92 days.

(21) Appl. No.: 12/318,159

(22) Filed: Dec. 22, 2008

(65) Prior Publication Data

US 2010/0007836 A1 Jan. 14, 2010

(30) Foreign Application Priority Data

Jul. 11, 2008 (KR) ........................ 10-2008-0067524

(51) Int. Cl.
*G02F 1/1343* (2006.01)

(52) U.S. Cl. ........................................................ 349/141

(58) Field of Classification Search ........................ None
See application file for complete search history.

(56) References Cited

U.S. PATENT DOCUMENTS 6,583,840 B1 * 6/2003 Inoue et al. .................. 349/141
7,623,211 B2 * 11/2009 Aota et al. .................... 349/143
7,679,707 B2 * 3/2010 Tanaka .......................... 349/138
2008/0284962 A1 * 11/2008 Horiguchi et al. ............ 349/139

FOREIGN PATENT DOCUMENTS

KR 10-2007-0023998 3/2007

* cited by examiner

*Primary Examiner* — David Nelms
*Assistant Examiner* — Thanh-Nhan P Nguyen
(74) *Attorney, Agent, or Firm* — Morgan, Lewis & Bockius LLP

(57) ABSTRACT

A liquid crystal display device includes a gate line on a substrate; a data line defining a pixel region by crossing the gate line; a thin film transistor formed at a crossing position between the gate line and the data line; a passivation layer protecting the thin film transistor; a pixel electrode connected with the thin film transistor; a common electrode generating an electric field with the pixel electrode; and a plurality of grooves on the passivation layer, wherein at least one of the pixel electrode and the common electrode is arranged at intervals in the pixel region, and the grooves are formed at intervals on the passivation layer disposed between the at least one of the pixel electrode and the common electrode arranged at intervals in the pixel region.

6 Claims, 17 Drawing Sheets

230
240a
210a
210b
240b
250
240b
250
T1
T2
220
211
100
II
II'
204
208a 208b
108

120
150
111
100
I'
140b
140b
140b
T2
T1
140a
130
108b
108a
108
110b
104
110a
I 150
111
100
I'
110b
110a
108b
108a
108
104
I 120
150
111
100
I'
130
108b
108a
108
110b
110a
104
I 120
150
111
100
I'
140b
140b
140b
140a
130
108b
108a
108
110b
110a
104
I 120
150
111
100
I'
140b
140b
140b
T2
T1
140a
130
108b
108a
108
110b
104
110a
I 220
211
100
II'
250
240b
250
T2
T1
240b
240a
230
208b
208a
108
210b
204
210a
II 220
211
100
II'
208b
208a
108
210b
204
210a
II

LIQUID CRYSTAL DISPLAY DEVICE AND DRIVING METHOD FOR FABRICATING THE SAME

This application claims the benefit of the Korean Patent Application No. 10-2008-0067524 filed on Jul. 11, 2008, which is hereby incorporated by reference as if fully set forth herein.

BACKGROUND OF THE INVENTION

1. Field of the Invention

The present invention relates to a liquid crystal display (LCD) device, and more particularly, to an LCD device capable of improving low-voltage operability and transmittance, and a method for fabricating the same.

2. Discussion of the Related Art

According to development of an information-oriented society, demand for a variety of display devices have been gradually increasing. Meeting such demand, recently, researches have been carried out on various flat panel display devices including a liquid crystal display (LCD), a plasma display panel (PDP), an electro luminescent display (ELD), a vacuum fluorescent display (VFD) and so forth. Some of those display devices are already widely used in various kinds of equipment.

The LCD is particularly widely used, replacing a cathode ray tube (CRT) as a mobile image displaying device, since having several advantages such as an excellent image quality, lightness, compactness, and low power consumption. Besides the mobile use, for example as a monitor of a laptop, the application field of the LCD is increasing and diversifying to monitors of a TV that receives and displays broadcasting signals and of a general computer.

In general, the LCD mainly includes a thin film transistor (TFT) array substrate, a color filter array substrate, and a liquid crystal layer interposed between the two substrates.

The TFT substrate includes pluralities of gate lines and data lines arranged on a substrate horizontally and vertically to thereby define a plurality of pixel regions, a TFT which is a switching device formed at crossing positions of the gate lines and the data lines, and pixel electrodes formed on the pixel regions.

The color filter substrate includes color filters embodying colors, and a black matrix defining the color filters and preventing reflection of external light.

Here, a passivation layer which protects the TFT transmits light at the pixel region. However, since the passivation layer absorbs or reflects light, the optical transmittance would be deteriorated. Also, when forming a electric field for a common electrode and the pixel electrode, the electric field is weakened due to the passivation layer. Accordingly, a higher driving voltage is required.

Furthermore, because the liquid crystal cannot be favorably operated on electrodes, the transmittance is greatly deteriorated on the electrodes.

SUMMARY OF THE INVENTION

Accordingly, the present invention is directed to a liquid crystal display (LCD) device and a method for fabricating the same that substantially obviate one or more problems due to limitations and disadvantages of the related art.

An object of the invention is to provide an LCD device capable of improving operability at a low voltage and optical transmittance, and a method for fabricating the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes a gate line on a substrate; a data line defining a pixel region by crossing the gate line; a thin film transistor formed at a crossing position between the gate line and the data line; a passivation layer protecting the thin film transistor; a pixel electrode connected with the thin film transistor; a common electrode generating an electric field with the pixel electrode; and a plurality of grooves on the passivation layer, wherein at least one of the pixel electrode and the common electrode is arranged at intervals in the pixel region, and the grooves are formed at intervals on the passivation layer disposed between the at least one of the pixel electrode and the common electrode arranged at intervals in the pixel region.

In another aspect, a method for fabricating a liquid crystal display device includes forming a gate line and a data line defining a pixel region by crossing each other on a substrate; forming a thin film transistor at the crossing position between the gate line and the data line; forming a passivation layer on the substrate including the TFT so as to protect the thin film transistor; forming a pixel electrode in connection with the thin film transistor; forming a common electrode to generate an electric field together with the pixel electrode; and forming a plurality grooves on the passivation layer, wherein at least one of the pixel electrode and the common electrode is arranged at intervals in the pixel region, and the plurality of grooves are formed at intervals on the passivation layer disposed between the at least one of the pixel electrode and the common electrode arranged at intervals in the pixel region.

It is to be understood that both the foregoing general description and the following detailed description of the invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
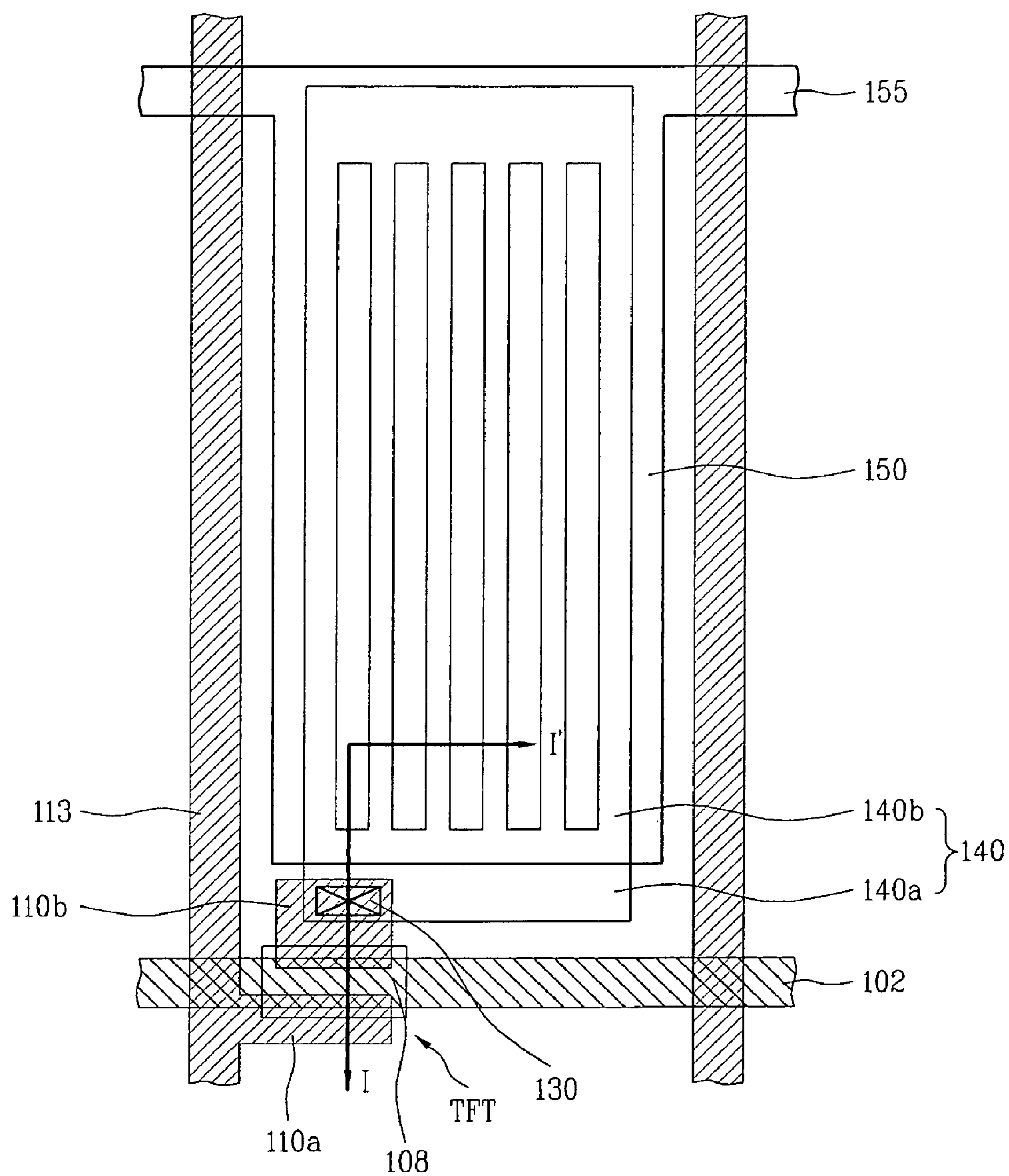
FIG. 1 is a plan view of a thin film transistor (TFT) substrate of an LCD device in a fringe field switching mode according to a first embodiment of the invention.
Figure 2:
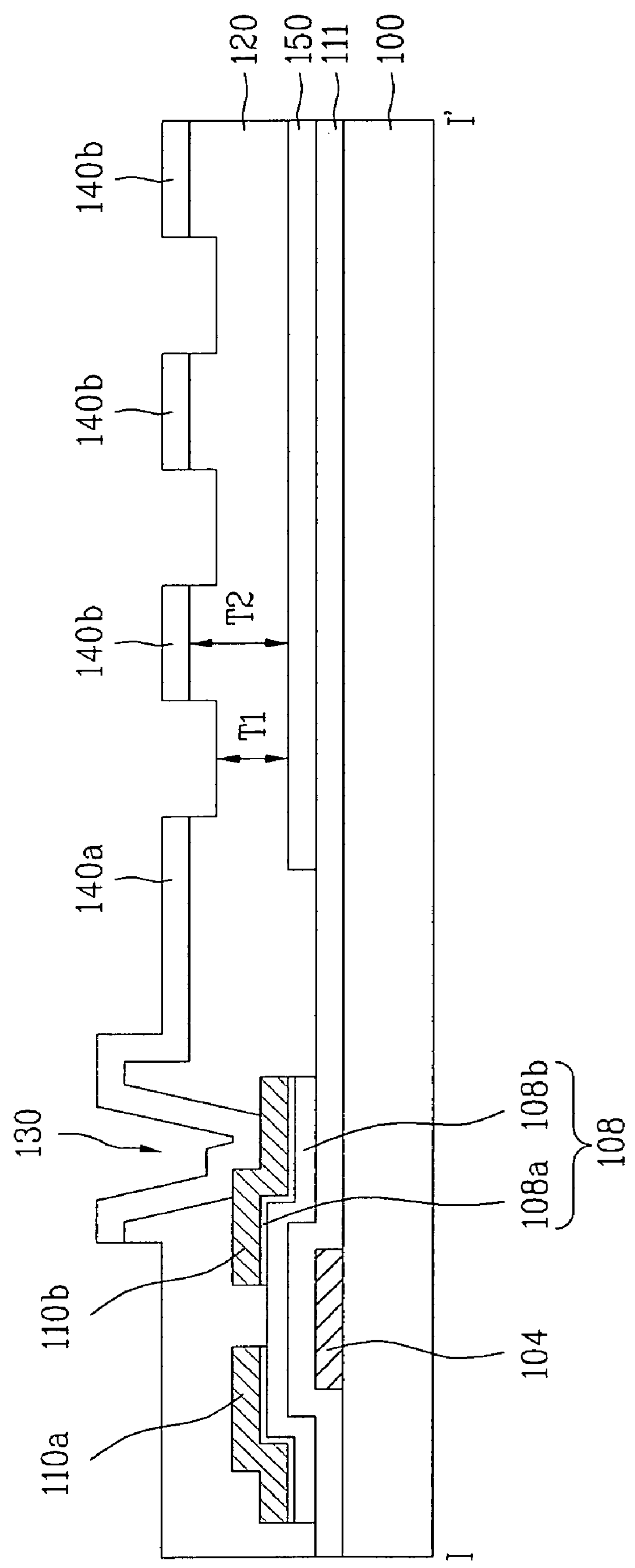
FIG. 2 is a cross-section view illustrating the TFT substrate across a line I-I' in FIG. 1.

FIG. 1 is a plan view of a thin film transistor (TFT) substrate of an LCD device in a fringe field switching mode according to a first embodiment of the invention, and FIG. 2 is a cross-section view illustrating the TFT substrate across a line I-I' in FIG. 1. Referring to FIGS. 1 and 2, the LCD device includes a plurality of gate lines 102 formed on a substrate 100, a plurality of data lines 113 crossing the gate lines 102 with gate insulating layers 111 interposed, thereby defining pixel regions, a TFT formed at respective crossing positions between the gate lines 102 and the data lines 113, a pixel electrode 140 connected with the TFT, a common electrode 150 having a plate form overlapping the pixel electrode 140 with interposition of a passivation layer 120, and a common line 155 connected with the common electrode 150 to supply the common electrode 150 with a common voltage for driving a liquid crystal.

The TFT includes a gate electrode 104 included in the gate line 102, the gate insulating layer 111 formed on the whole surface of the TFT substrate 100 whereon the gate line 102 is formed, overlapping the gate electrode 104, a semiconductor layer 108 constituted by an ohmic contact layer 108*a* and an active layer 108*b* and formed on the gate insulating layer 111 to overlap the gate electrode 104, a source electrode 110*a* formed on the semiconductor layer 108 to contact with the data line 113, and a drain electrode 110*b* formed on the semiconductor layer 108 to face the source electrode 110*a*.

A fringe field is formed by setting an interval between the pixel electrode 140 and the common electrode 150 to be less than a cell gap of upper and lower substrates of an LCD panel. Liquid crystal molecules filling the gap between the upper and lower substrates are operated by the fringe field, accordingly enhancing the aperture ratio and the transmittance.

The pixel electrode 140 includes a pixel electrode horizontal part 140*a* having a plate form including slits, electrically connected with the drain electrode 110*b* exposed through a contact hole 130 penetrating the passivation layer 120 and postured parallel with the gate lines 102. Also, the pixel electrode 140 includes pixel electrode vertical parts 140*b* forming the fringe field together with the common electrode 150 through connection with the pixel electrode horizontal part 140*a*. The pixel electrode vertical parts 140*b* are spaced from one another.

The common electrode 150 is formed on the gate insulating layer 111 in the form of a plate, and overlapped with the pixel electrode 140 with the passivation layer 120 interposed between the common electrode 150 and the pixel electrode 140. The common electrode 150 and the pixel electrode 140 generate the fringe field. Positions of the common electrode 150 and the pixel electrode 140 are exchangeable. That is, while the pixel electrode 140 is formed in a plate form at a lower part of the passivation layer 120, the common electrode 150 may be formed overlapping the pixel electrode 140 with the passivation layer 120 interposed.

Here, the passivation layer 120 formed between the pixel electrode 140 and the common electrode 150 may cause deterioration of the optical transmittance and the electric field between the pixel electrode 140 and the common electrode 150. Therefore, a high driving voltage may be required. To overcome such a problem, grooves having a predetermined depth are formed on the passivation layer 120 disposed between the common electrodes 150 or the pixel electrodes 140, through dry etching using the common electrode 150 or the pixel electrode 140 as a mask. A height T1 of the passivation layer 120 disposed between the common electrodes 150 or the pixel electrodes 140 including the grooves is smaller than a height T2 of the passivation layer 120 disposed under the common electrode 150 or the pixel electrode 140, and the height difference (T2−T1) is set to about 0.1-0.7 μm which would not incur damage of an alignment layer during physical rubbing in a horizontally aligned structure.

The passivation layer 120 may be formed by vapor-depositing an inorganic insulator, for example, through plasma enhanced chemical vapor deposition (PECVD). Also, the passivation layer 120 may be formed by spin or spinless coating of an organic insulator such as an acryl-based organic compound, Benzocyclobuten (BCB), and Perfluorocyclobutane (PFCB) having a low dielectric constant.

The pixel electrode 140, the common electrode 150 and the common line 155 are formed of a transparent conductive material, for example, indium tin oxide (ITO), tin oxide (TO), indium zinc oxide (IZO), indium tin zinc oxide (ITZO) and so on.

In case that the common electrode 150 and the common line 155 are formed of the same material, they may be integrally formed. However, in case that the common electrode 150 and the common line 155 are formed of different materials and at different layers, they are electrically connected through a dedicated contact hole. In this case, the common electrode 150 may be structured in a single layer or multilayers comprising metal such as Mo, Al, Al—Nd, Cu, Cr and Ti or an alloy of the metals.

Thus, the transmittance can be improved by forming the grooves by etching the passivation layer 120 disposed between the electrodes 140 or 150 by a predetermined depth without an increase of voltage or structural modification. Also, the same transmittance can be achieved with a lower voltage, thereby reducing consumed power.

Figure 3A:
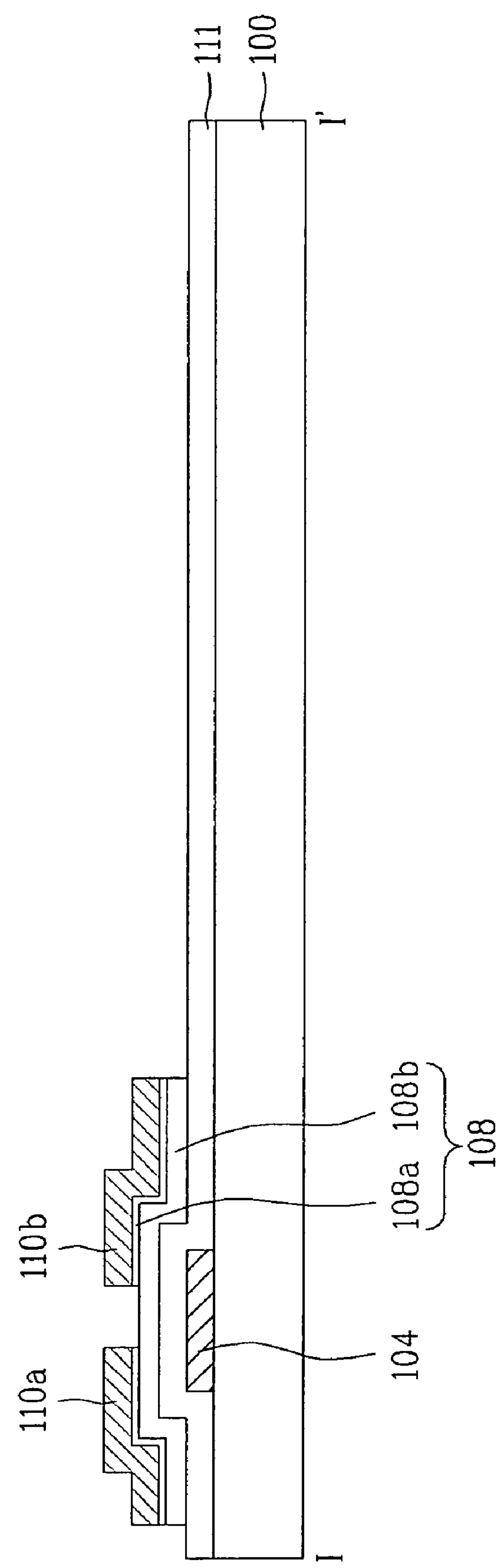
FIG. 3A to FIG. 3E are cross-section views illustrating processes of fabricating the TFT substrate shown in FIG. 2.

FIG. 3A to FIG. 3E are cross-section views illustrating processes of fabricating the TFT substrate shown in FIG. 2. Referring to FIG. 3A, the TFT transistor is structured on a substrate 100, comprising the gate electrode 104, the gate insulating layer 111 formed on the whole surface of the substrate 100 including the gate electrode 104, the semiconductor layer 108 including the ohmic contact layer 108*a* and the active layer 108*b* formed on the gate insulating layer 111 to be overlapped with the gate electrode 104, the source electrode 110*a* diverged from the data line 113 and formed on the semiconductor layer 108, and the drain electrode 110*b* formed on the semiconductor layer 108 to face the source electrode 110*a*.

For example, a gate metal layer is formed on the substrate 100 through vapor-deposition such as sputtering, and then patterned through photolithography and etching using a mask, thereby forming the gate line 102 (shown in FIG. 1) and the gate electrode 104.

The gate metal layer may be structured in a single layer or multiple layers comprising metal such as Mo, Al, Al—Nd, Cu, Cr and Ti or an alloy of the metals.

Next, the gate insulating layer 111, an amorphous silicon (a-Si) layer, and another a-Si layer doped with dopants (n+) are sequentially formed on the whole surface of the substrate 100 which includes the gate electrode 104, through vapor-deposition such as PECVD. Next, a source and drain metal layer is vapor-deposited for example through sputtering, and then patterned through photolithography and etching using a mask, accordingly forming the semiconductor layer 108 comprising the ohmic contact layer 108*a* and the active layer 108*b*, the data line 113 (FIG. 1) and the source and drain electrodes 110*a* and 110*b*. Here, diffraction exposure or a halftone mask is used for electrical isolation among the source electrode 110*a*, the drain electrode 110*b* and the ohmic contact layer 108*a*.

An inorganic insulator such as SiOx or SiNx is used for the material of the gate insulating layer 111. The source and drain electrodes 110*a* and 110*b* may be structured in a single layer or multiple layers comprising metal such as Mo, Al, Al—Nd, Cu, Cr and Ti or an alloy of the metals.

Figure 3B:
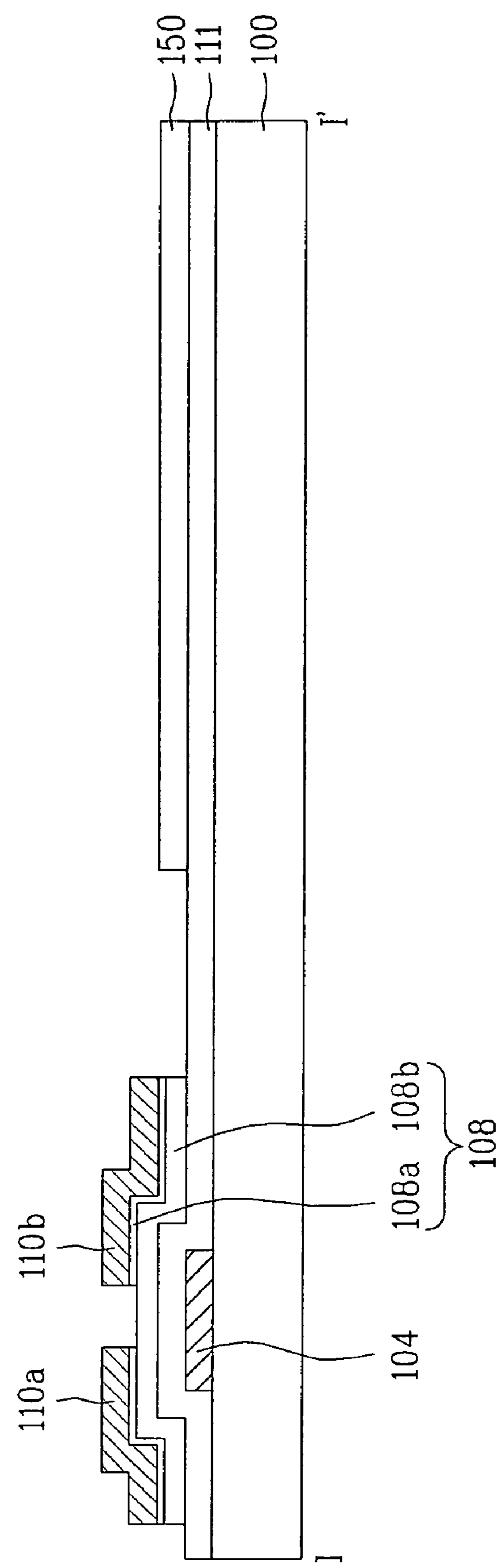

After that, as shown in FIG. 3B, a first transparent conductive layer is vapor-deposited on the whole surface of the substrate 100 including the source and drain electrodes 110*a* and 110*b*, and then patterned through photolithography and etching using a mask, accordingly forming the common electrode 150 having a plate form on the pixel region. In addition, the common line 155 (FIG. 1) is integrally formed with the common electrode 150 to apply the common voltage to the common electrode 150.

The first transparent conductive layer includes indium tin oxide (ITO), tin oxide (TO), indium zinc oxide (IZO), indium tin zinc oxide (ITZO) and so on.

When the common electrode 150 and the common line 155 (FIG. 1) are made of different materials and disposed on different layers, they are connected electrically through a dedicated contact hole. In this case, the common electrode 150 may be structured in a single layer or plural layers comprising metal such as Mo, Al, Al—Nd, Cu, Cr and Ti or an alloy of the metals.

Figure 3C:
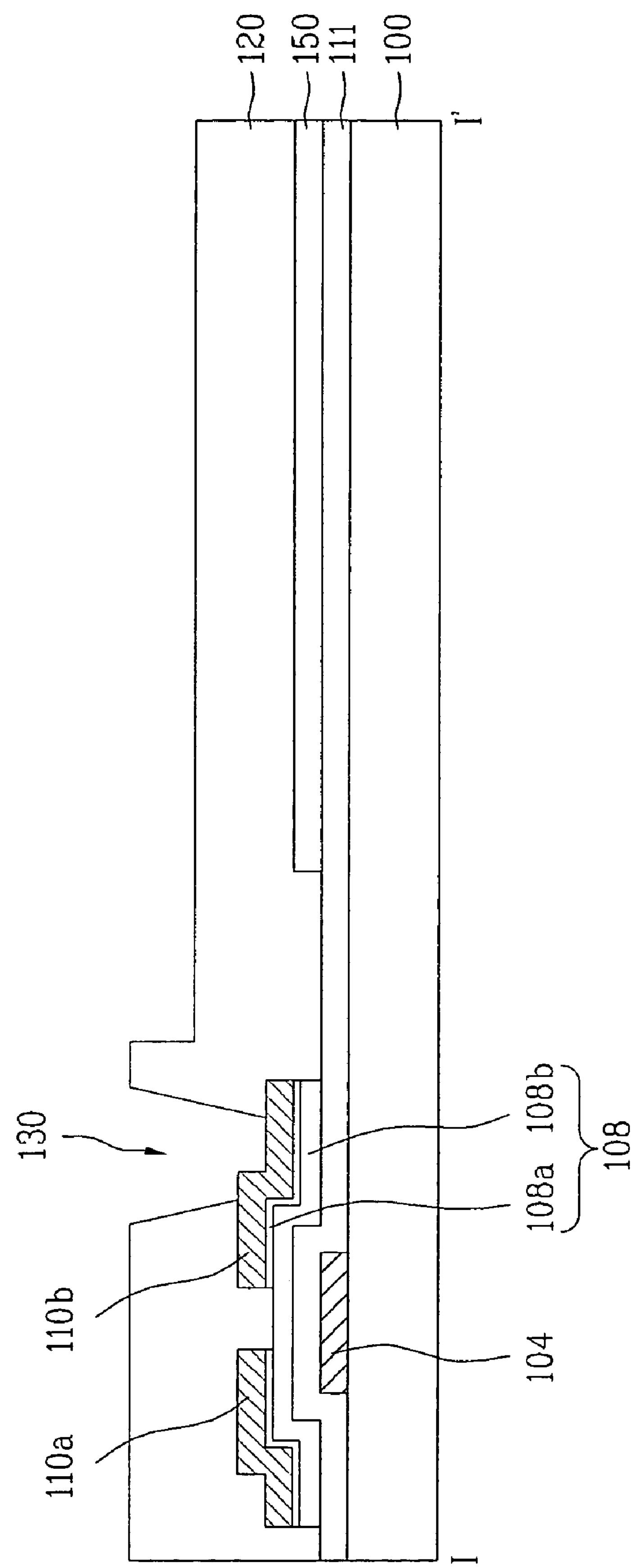

Referring to FIG. 3C, the passivation layer 120 including the contact hole 130 for exposure of the drain electrode 110*b* is formed on the whole surface of the substrate 100 that includes the common electrode 150. For example, after the passivation layer 120 is formed throughout the surface of the substrate 100 including the common electrode 150, photolithography and etching are performed to pattern the passivation layer 120, accordingly forming the contact hole 130 that exposes the drain electrode 110*b*.

The passivation layer 120 may be formed by vapor-depositing an inorganic insulator such as the gate insulating layer 111, for example by PECVD, or formed by spin or spinless coating of an organic insulator such as BCB and PFCB having a low dielectric constant.

Figure 3D:
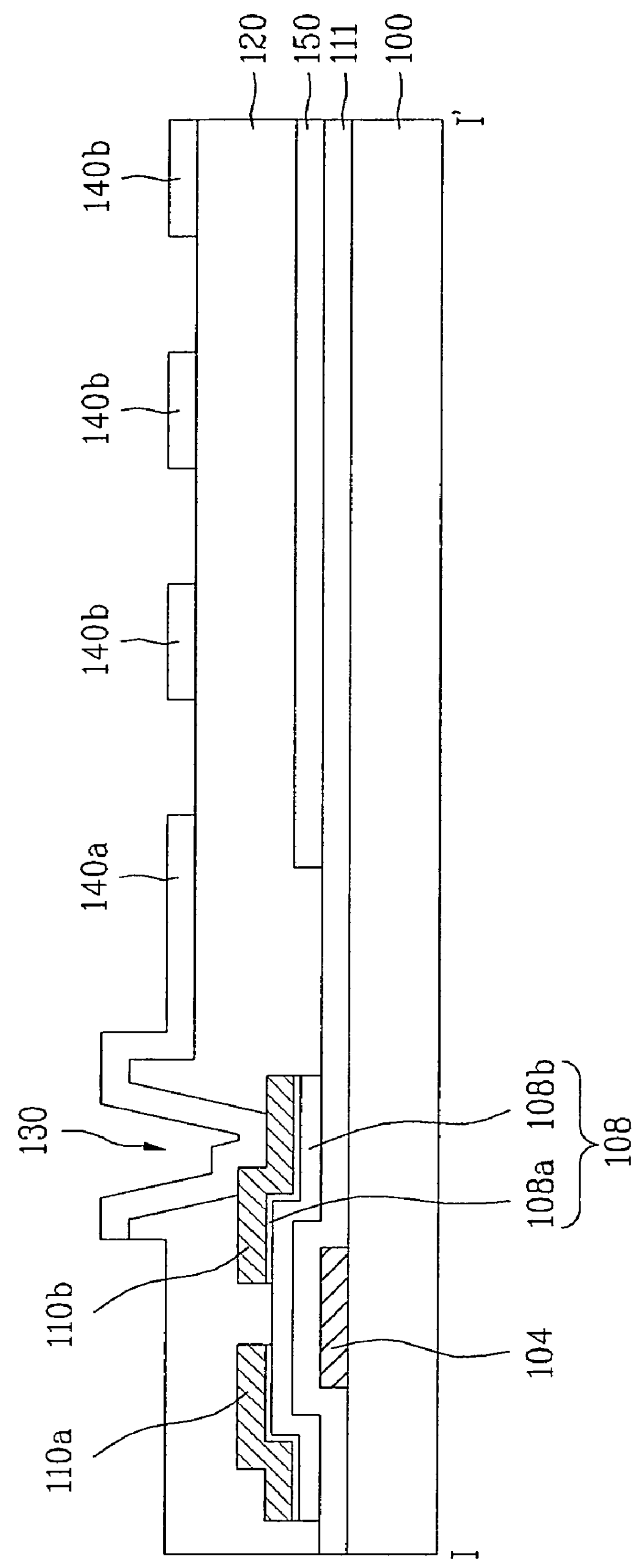

Referring to FIG. 3D, the pixel electrode 140 is formed on the passivation layer 120. For example, a second transparent conductive layer is vapor-deposited on the passivation layer 120 and then patterned by photolithography and wet etching using a mask. Accordingly, there are formed the pixel electrode horizontal part 140*a* electrically connected with the drain electrode 110*b* through the contact hole 130 and the pixel electrode vertical part 140*b* parallel with the date lines 113 (FIG. 1). The pixel electrode 140 and the common electrode 150, overlapping each other with the passivation layer 120 interposed therebetween, generate the fringe field.

The common electrode 150 and the pixel electrode 140 may be exchanged in their positions. That is, the pixel electrode 140 may be formed in the plate form under the passivation layer 120, the common electrode 150 may be overlapped with the pixel electrode 140 with the passivation layer 120 interposed between the pixel electrode 140 and the common electrode 150. The second transparent conductive layer is formed of any of ITO, TO, IZO and ITZO.

Figure 3E:
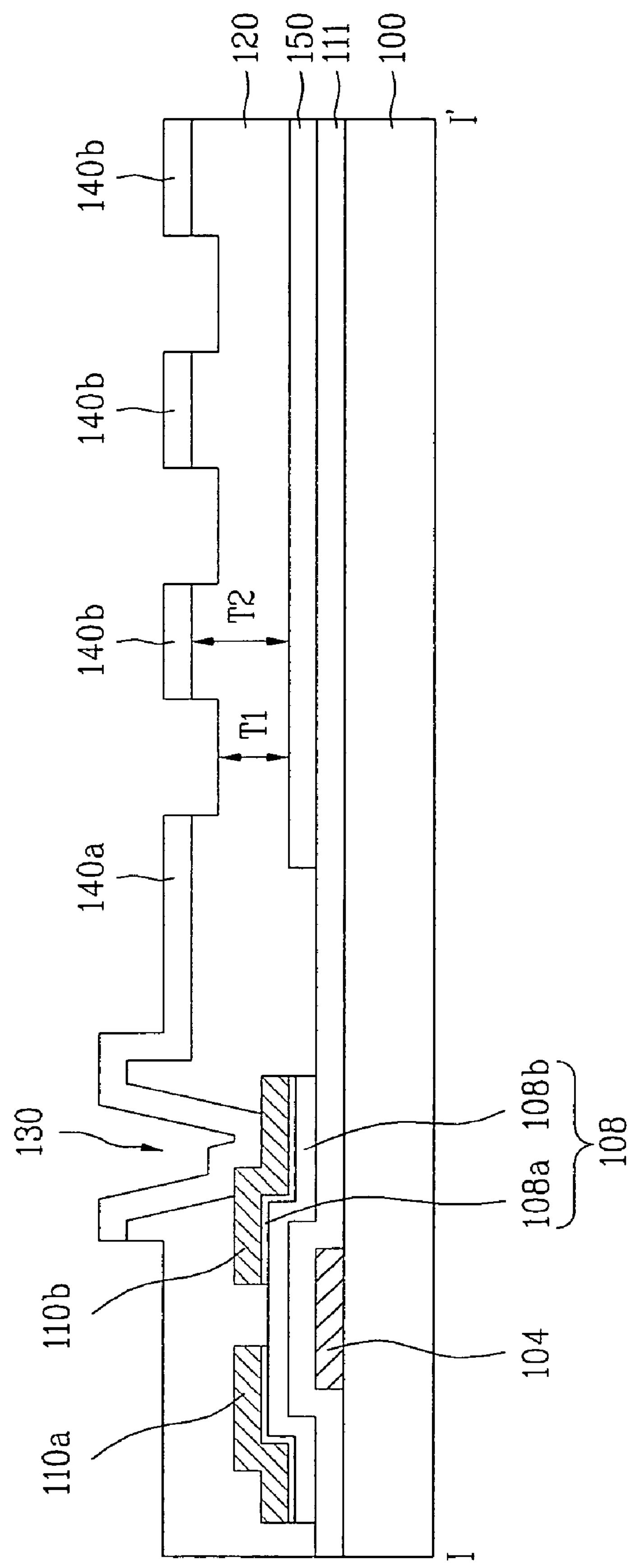

Next, as shown in FIG. 3E, dry etching is performed on the passivation layer 120 using the common electrode 150 or the pixel electrode 140 as a mask, thereby forming grooves of a predetermined depth at the passivation layer 120 between the common electrodes 150 or the pixel electrodes 140.

After the wet etching for forming the pixel electrode 140 and the common electrode 150, dry etching is continuously performed to pattern the passivation layer 120 precisely corresponding to overlay alignment of patterns of the common electrode 150 or the pixel electrode 140. Accordingly, the grooves are formed. The passivation layer 120 is self-aligned through the patterns of the electrode 140 or 150.

The height T1 of the passivation layer 120 disposed between the common electrodes 150 or the pixel electrodes 140 including the grooves is smaller than the height T2 of the passivation layer 120 disposed under the common electrode 150 or the pixel electrode 140, and the height difference (T2−T1) is set to about 0.1-0.7 μm which would not incur damage of an alignment layer during physical rubbing in a horizontally aligned structure.

Equation 1 is suggested to obtain a threshold voltage $V_{th}$, wherein $K_{IPS}$ denotes a rotational elasticity coefficient, '$\epsilon_0$' denotes a vacuum permittivity, '$\epsilon_r$' denotes an intrinsic constant of the liquid crystal, 'd' denotes a cell gap, and 'l' denotes a distance between the electrodes.

$$V_{th} = \frac{\pi l}{d}\sqrt{\frac{K_{IPS}}{\varepsilon_0 \varepsilon_r}} \quad \text{Equation 1}$$

It can be appreciated from [Equation 1] that, by thus forming the grooves by etching the passivation layer 120 disposed between the common electrodes 150 or the pixel electrodes 140 by a predetermined depth, the cell gap of the upper and lower substrates is increased. Therefore, the distance between the common electrodes 150 or the pixel electrodes 140 forming the fringe field is decreased. Consequently, the threshold voltage is decreased and low-voltage driving can be achieved.

Figure 4:
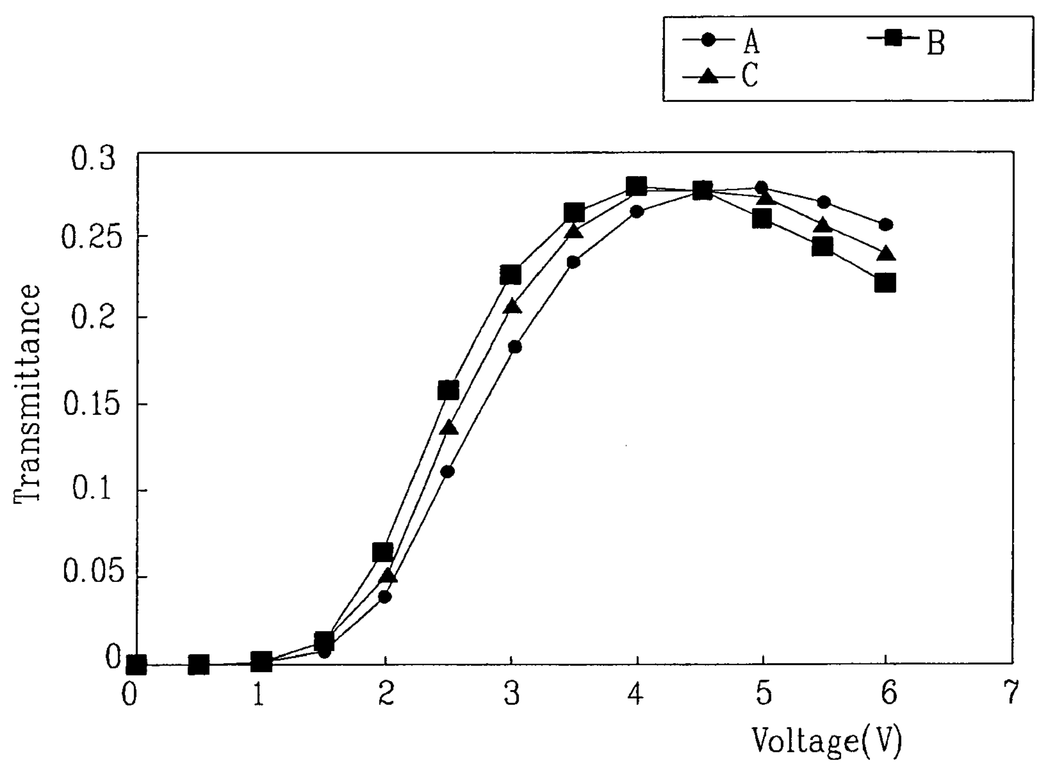
FIG. 4 is a graph illustrating the transmittance according to voltage in the LCD device according to the first embodiment of the invention.

FIG. 4 is a graph showing the transmittance according to the voltage. Referring to FIG. 4, a structure A is a flat structure without the grooves formed at the passivation layer 120 disposed under the common electrode 150 or the pixel electrode 140 in the pixel region. In a structure B, the grooves of 0.3 μm are formed at the passivation layer 120 between the common electrodes 150 or the pixel electrodes 140. In a structure C, the grooves of 0.2 μm are formed at the passivation layer 120 between the common electrodes 150 or the pixel electrodes 140.

For example, when a voltage of 3V is applied, the transmittance is about 0.17 in the structure A without the grooves, about 0.23 in the structure B with the grooves of 0.3 μm, and about 0.21 in the structure C with the grooves of 0.2 μm. Thus, the structure B and C having the grooves at the passivation layer 120 enable the low-voltage driving with the same transmittance, in comparison with the structure A according to a related art, accordingly reducing the power consumption.

Thus, the transmittance can be enhanced with the same voltage applied, by forming the grooves through etching of the passivation layer 120.

Figure 5:
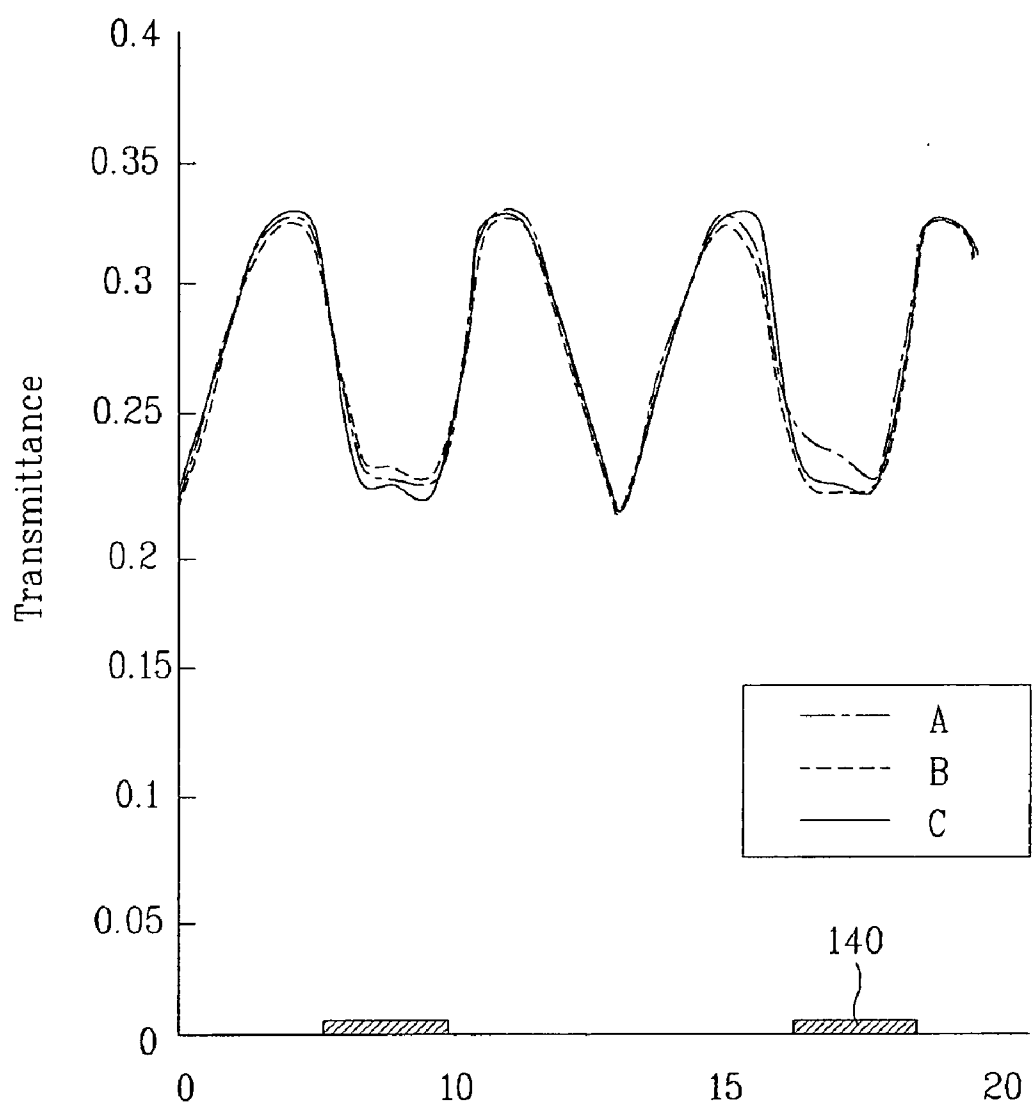
FIG. 5 is a graph illustrating the transmittance at sectional surfaces of a pixel electrode and a common electrode forming a fringe field in the LCD according to the first embodiment of the invention.

FIG. 5 is a graph showing the transmittance at a sectional surface of the pixel electrode 140 constituting the fringe field, according to a first embodiment of the invention. It can be understood that the transmittance of the structures B and C having the grooves at the passivation layer 120 is further improved at an upper part of the respective pixel electrode 140 in the pixel region, compared to the transmittance of the structure A not having the grooves. Here, since the pixel electrode 140 and the common electrode 150 may be exchanged in their positions, the graph may denote the transmittance at a sectional surface of the common electrode 150.

Figure 6:
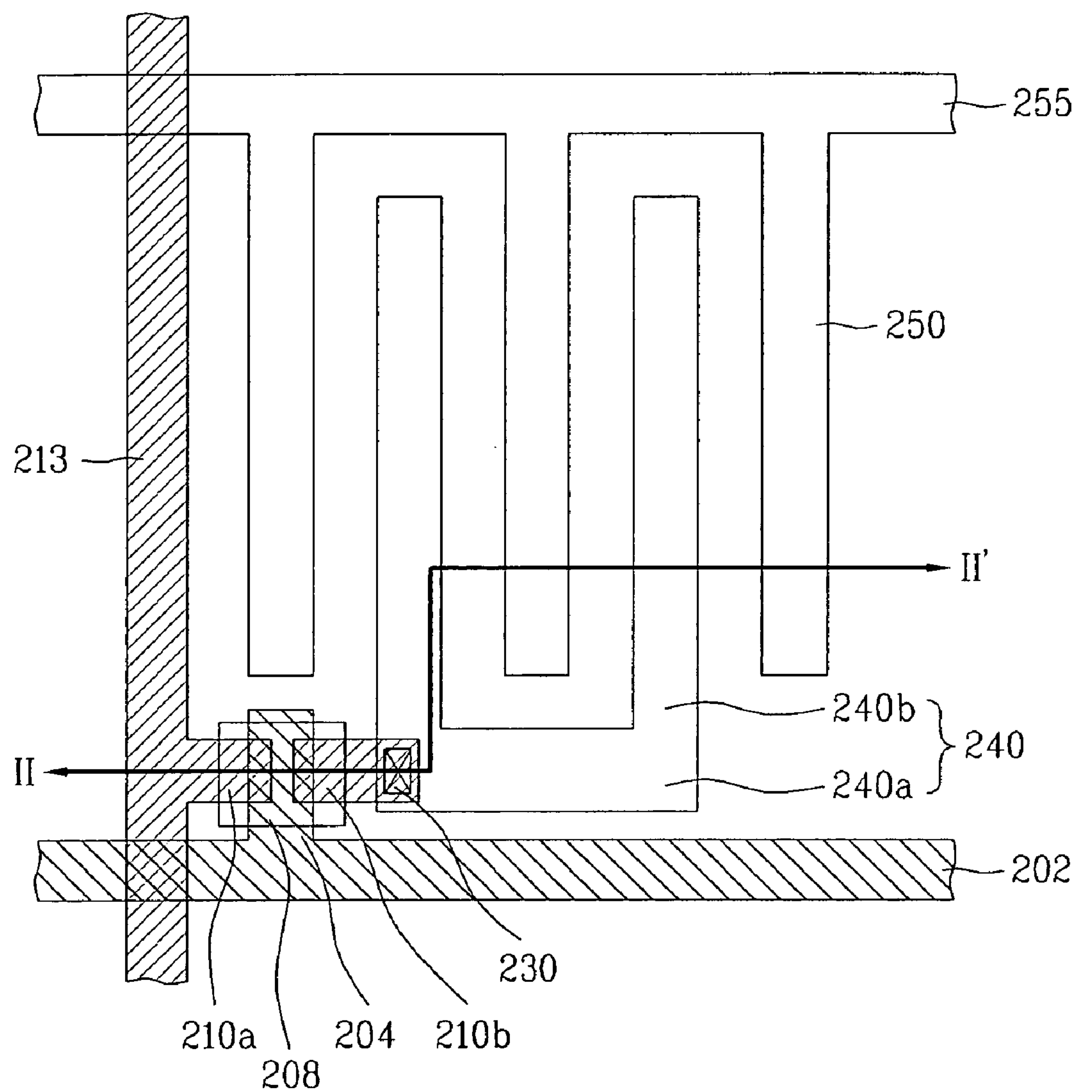
FIG. 6 is a plan view of a TFT substrate of an in-plane switching mode LCD device according to a second embodiment of the invention.
Figure 7:
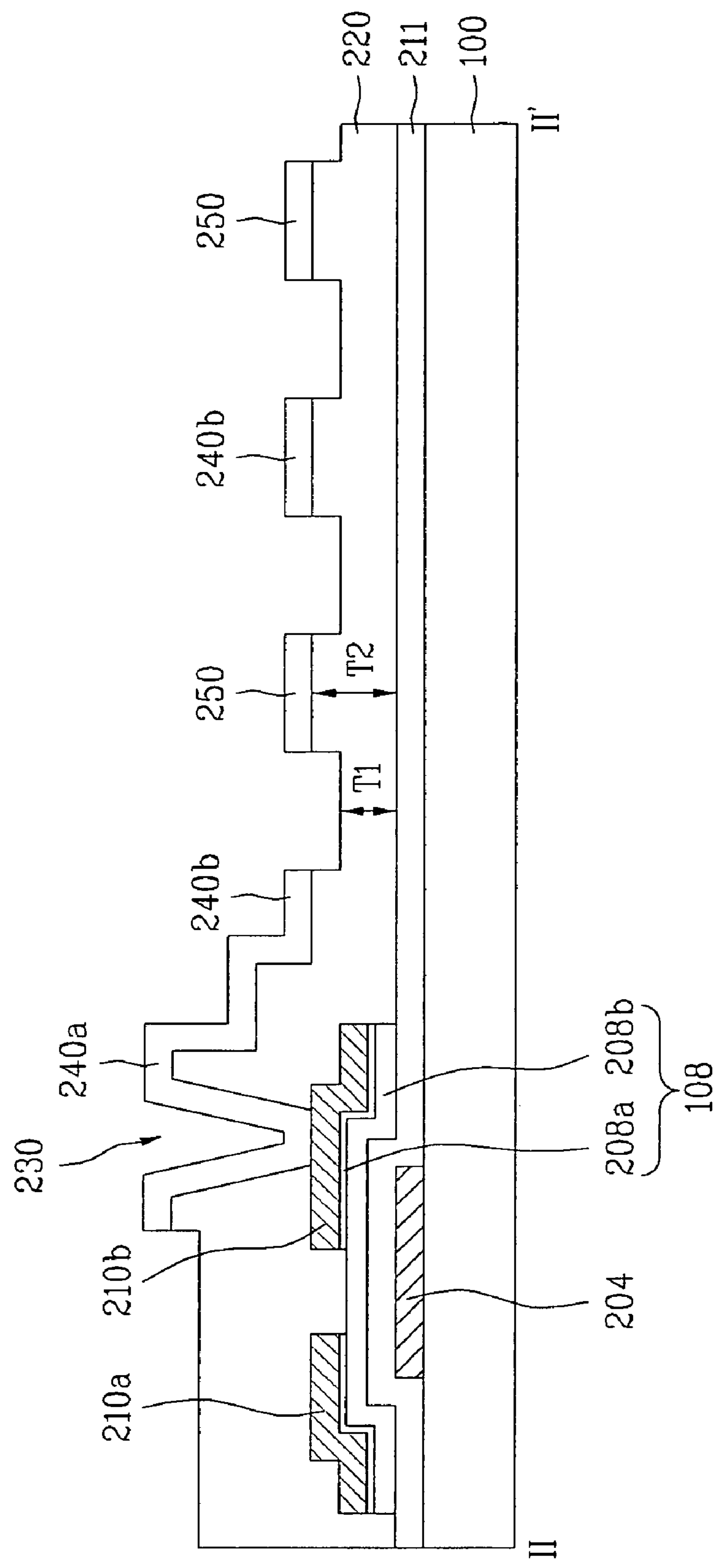
FIG. 7 is a cross-section view of the TFT substrate of FIG. 6 along a line II-II'.

FIG. 6 is a plan view of a TFT substrate in an LCD device of an in-plane switching (IPS) mode, according to a second embodiment of the invention, and FIG. 7 is a cross-section view of the TFT substrate of FIG. 6, cut along a line II-II'. Referring to FIGS. 6 and 7, the LCD device of the IPS mode includes a plurality of gate lines 202 formed on a substrate 100, a plurality of data lines 213 crossing the gate lines 202 with gate insulating layers 211 interposed, thereby defining pixel regions, a TFT formed at respective crossing positions between the gate lines 202 and the data lines 213, a pixel electrode 240 forming the horizontal field along with the pixel electrode 240 at each pixel region, and a common line 255 connected with the common electrode 250 to supply the common electrode 250 with a common voltage for driving a liquid crystal.

The TFT includes a gate electrode 204 diverged from the gate line 202, the gate insulating layer 211 formed on the whole surface of the TFT substrate 100 whereon the gate line 202 is formed, to overlap the gate electrode 204, a semiconductor layer 208 constituted by an ohmic contact layer 208*a* and an active layer 208*b* and formed on the gate insulating layer 211 to overlap the gate electrode 204, a source electrode 210*a* formed on the semiconductor layer 208 as diverged from the data line 213, and a drain electrode 210*b* formed on the semiconductor layer 208 to face the source electrode 210*a*.

The pixel electrode 240 includes a pixel electrode horizontal part 240*a* electrically connected with the drain electrode 210*b* exposed through a contact hole 230 penetrating a passivation layer 220 and postured parallel with the gate line 202. The pixel electrode 240 further includes a pixel electrode finger part 240*b* forming the fringe field together with the common electrode 150 through connection with the pixel electrode horizontal part 240*a*.

The common line 255 is formed parallel with the gate line 202. The common electrode 250 is formed at each pixel region, being diverged from the common line 255. The common electrode 250 forms a horizontal field by being alternately arranged with the pixel electrode finger part 240*b*.

At a lower part of the pixel electrode 240 and the common electrode 250, the passivation layer 220 is formed to protect the TFT. However, the passivation layer 220 formed at an opened region, that is, between the pixel electrodes 240 or the common electrodes 250 deteriorates the optical transmittance. To solve this problem, grooves having a predetermined depth are formed on the passivation layer 220 between the common electrodes 250 or the pixel electrodes 240, through dry etching using the common electrode 250 or the pixel electrode 240 as a mask. A height T1 of the passivation layer 220 disposed between the common electrodes 250 or the pixel electrodes 240 is smaller than a height T2 of the passivation layer 120 disposed under the common electrode 250 or the pixel electrode 240, and the height difference (T2−T1) is set to about 0.1-0.7 μm which would not incur damage of an alignment layer during physical rubbing in a horizontally aligned structure.

The passivation layer 220 may be formed by vapor-depositing an inorganic insulator such as the gate insulating layer 211, for example by PECVD, or formed by spin or spinless coating of an organic insulator such as BCB and PFCB having a low dielectric constant.

The pixel electrode 240, the common electrode 250 and the common line 255 are formed of a transparent conductive material such as ITO, TO, IZO, ITZO and so on.

Here, the common electrode 250 and the common line 255 may be integrally formed with each other when being formed of the same material. When formed of different materials at different layers, the common electrodes 250 and the common line 255 are electrically connected through a dedicated contact hole. In this case, the common electrode 250, may be structured in a single layer or plural layers comprising metal such as Mo, Al, Al—Nd, Cu, Cr and Ti or an alloy of the metals.

As can be appreciated from [Equation 1], by thus forming the grooves by etching the passivation layer 220 between the common electrodes 250 or the pixel electrodes 240 by a predetermined depth, the cell gap of the upper and lower substrates is increased. Therefore, since the distance between the common electrodes 250 or the pixel electrodes 240 forming the fringe field is decreased, the threshold voltage is decreased and low-voltage driving can be achieved.

Figure 8A:
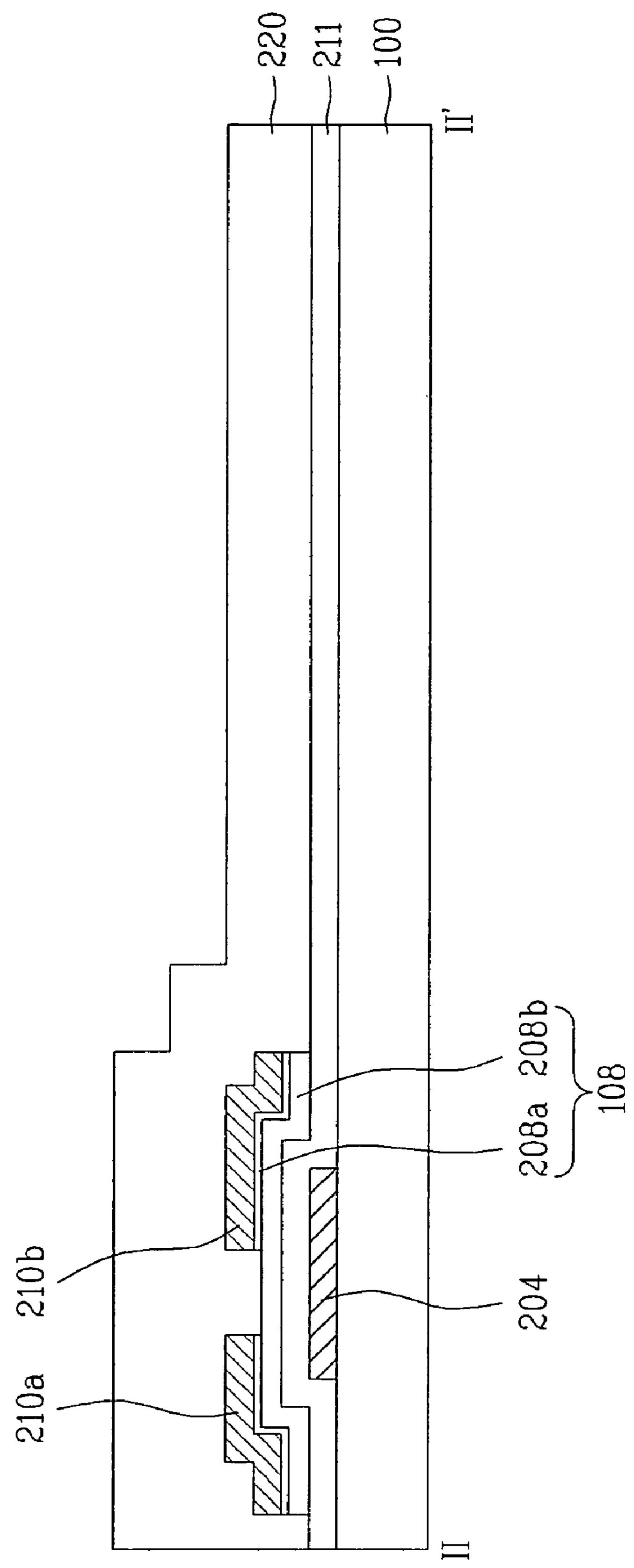
FIG. 8A to FIG. 8D are cross-section views illustrating processes of fabricating the TFT substrate shown in FIG. 7.

FIG. 8A to FIG. 8D are cross-section views illustrating processes of fabricating the TFT substrate shown in FIG. 7. Referring to FIG. 8A, the TFT is formed to comprise the gate electrode 204 on the substrate 100, the gate insulating layer 211 formed on the substrate 100 including the gate electrode 204, the semiconductor layer 208 constituted by an ohmic contact layer 208*a* and an active layer 208*b* and formed on the gate insulating layer 211 to overlap the gate electrode 204, the source electrode 210*a* formed on the semiconductor layer 208 as diverged from the data line 213 (FIG. 6), and the drain electrode 210*b* formed on the semiconductor layer 208 to face the source electrode 210*a*.

For example, a gate metal layer is formed on the substrate 100 through vapor-deposition such as sputtering, and then patterned through photolithography and etching using a mask, thereby forming the gate line 202 (FIG. 6) and the gate electrode 204.

The gate metal layer may be structured in a single layer or multiple layers comprising metal such as Mo, Al, Al—Nd, Cu, Cr and Ti or an alloy of the metals.

Next, the gate insulating layer 211, an a-Si layer, and another a-Si layer doped with dopants (n+) are sequentially formed on the whole surface of the substrate 100 which includes the gate electrode 204, through vapor-deposition such as PECVD. Then, a source and drain metal layer is vapor-deposited for example through sputtering, and patterned through photolithography and etching using a mask, accordingly forming the semiconductor layer 208 comprising the ohmic contact layer 208*a* and the active layer 208*b*, the data line 213 (FIG. 6) and the source and drain electrodes 210*a* and 210*b*. Here, diffraction exposure or a halftone mask is used for electrical isolation among the source electrode 210*a*, the drain electrode 210*b* and the ohmic contact layer 208*a*.

An inorganic insulator such as SiOx or SiNx is used for the material of the gate insulating layer 211. The source and drain electrodes 210*a* and 210*b* may be structured in a single layer or multiple layers comprising metal such as Mo, Al, Al—Nd, Cu, Cr and Ti or an alloy of the metals.

Figure 8B:
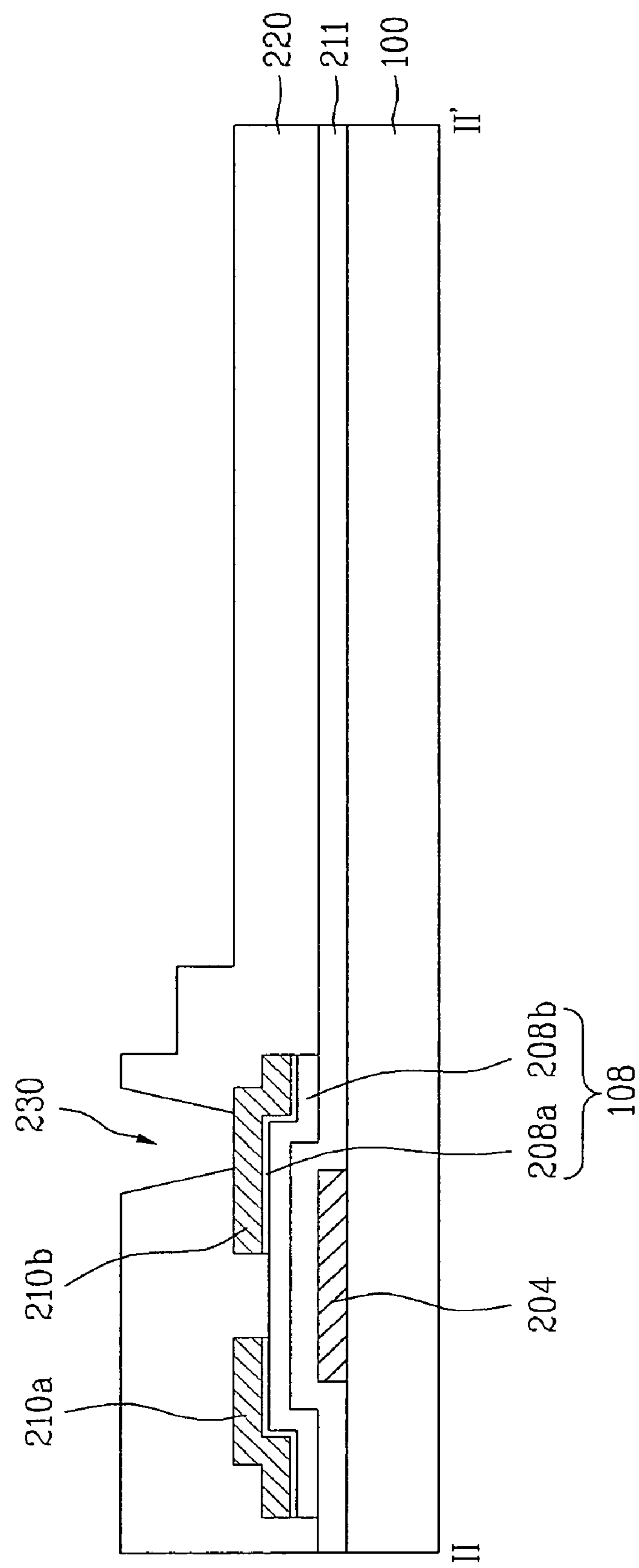

Next, the passivation layer 220 is formed on the whole surface of the substrate 100 including the source and drain electrodes 210*a* and 210*b*, and then patterned by photolithography and etching using a mask as shown in FIG. 8B. As a result, the contact hole 230 that exposes the drain electrode 210*b* is formed.

The passivation layer 220 may be formed by vapor-depositing an inorganic insulator such as the gate insulating layer 211, for example by PECVD, or formed by spin or spinless coating of an organic insulator such as BCB and PFCB having a low dielectric constant.

Figure 8C:
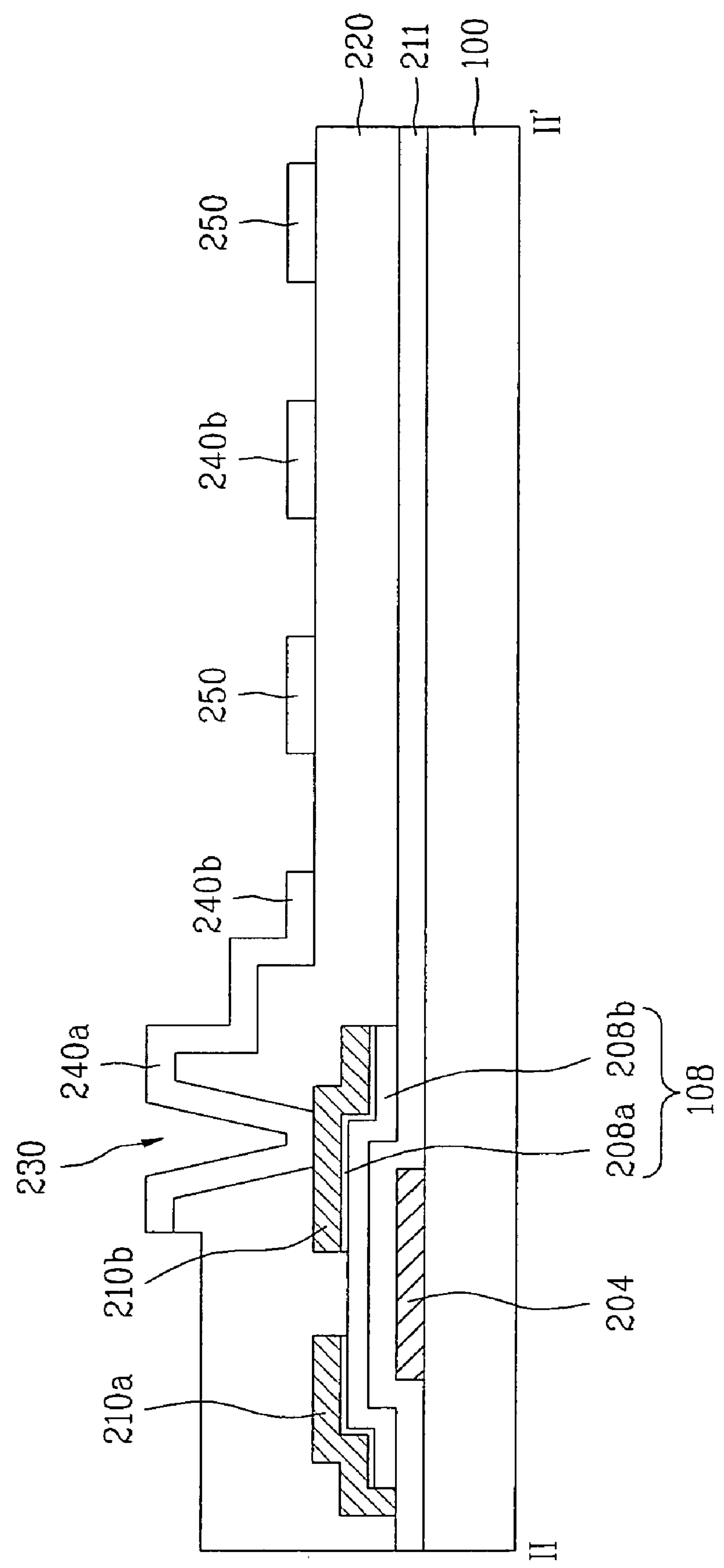

Referring to FIG. 8C, the common electrode 250 and the pixel electrode 240 are formed on the passivation layer 220 having the contact hole 230. For example, a transparent conductive layer is vapor-deposited on the passivation layer 220, and then patterned by photolithography and etching using a mask. As a result, there are formed the pixel electrode horizontal part 240*a* electrically connected with the drain electrode 210*b* through a contact hole 230, the pixel electrode finger part 240*b* connected with the pixel electrode horizontal part 240*a*, the common electrode 250 forming the fringe field together with the pixel electrode horizontal part 240*a*, and the common line 255 connected with the common electrode 250 to supply the common electrode 250 with a common voltage for driving the liquid crystal. Here, the transparent conductive layer is formed of any of ITO, TO, IZO and ITZO.

Figure 8D:
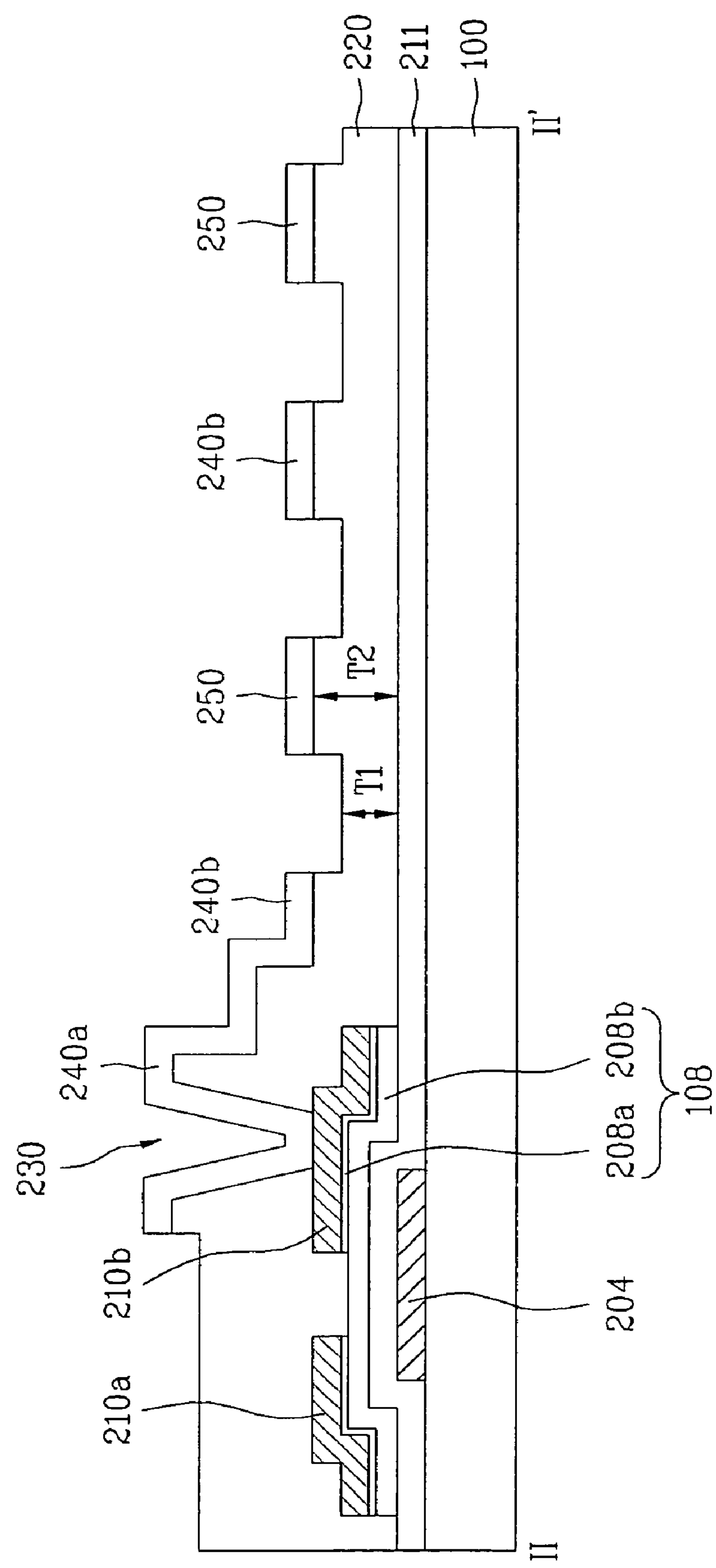

Next, as shown in FIG. 8D, grooves having a predetermined depth are formed on the passivation layer 220 disposed between the common electrodes 250 or the pixel electrodes 240 through dry etching using the common electrode 250 and the pixel electrode 240 as masks. That is, after performing wet etching for forming the pixel electrode 240 or the common electrode 250, dry etching is continuously performed to pattern the passivation layer 220 precisely corresponding to overlay alignment of patterns of the common electrode 250 and the pixel electrode 240. The passivation layer 220 is self-aligned through the patterns of the electrodes 240 and 250.

The height T1 of the passivation layer 220 disposed between the common electrodes 250 or the pixel electrodes 240 including the grooves is smaller than the height T2 of the passivation layer 220 disposed under the common electrode 250 or the pixel electrode 240, and the height difference (T2−T1) is set to about 0.1-0.7 μm which would not incur damage of an alignment layer during physical rubbing in a horizontally aligned structure.

Figure 9:
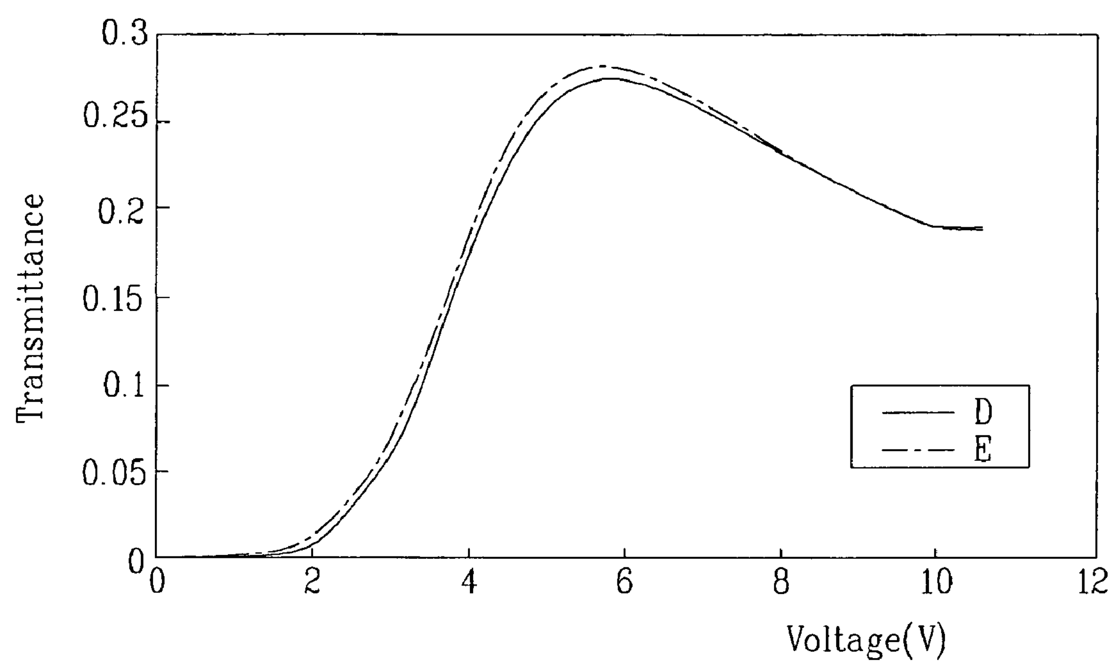
FIG. 9 is a graph illustrating the transmittance according to voltage in the LCD device according to the second embodiment of the invention.

FIG. 9 is a graph illustrating the transmittance according to the voltage in the LCD according to the second embodiment of the invention. In FIG. 9, a structure D is a related art flat structure without the grooves formed on the passivation layer 220 under the common electrode 250 and the pixel electrode 240 in the pixel region. A structure E includes the grooves formed at the passivation layer 220 between the common electrodes 250 or the pixel electrodes 240 in the pixel region.

At the same voltage, the transmittance is higher in the structure E with the grooves formed at the passivation layer 220 than in the structure D without the grooves. In other words, compared to the related art structure D, the structure E having the grooves is capable of low-voltage driving, accordingly reducing the power consumption.

Figure 10:
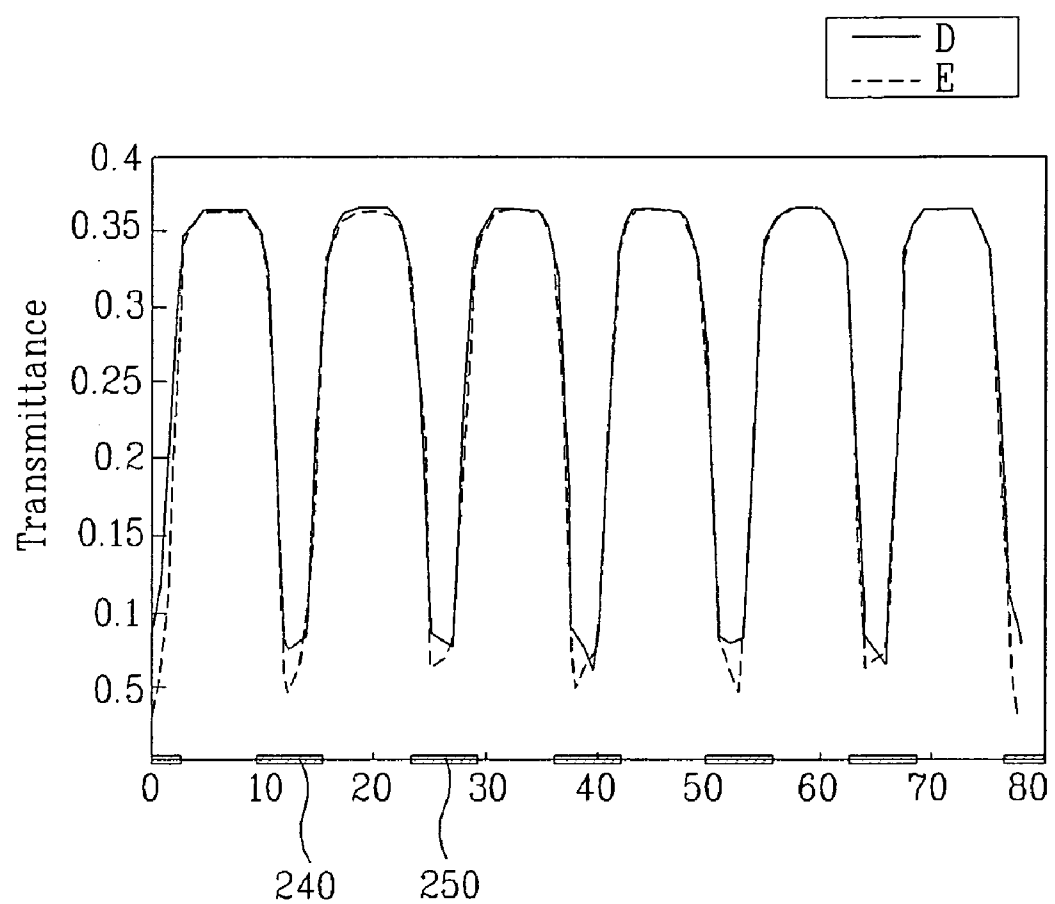
FIG. 10 is a graph illustrating the transmittance at sectional surfaces of a pixel electrode and a common electrode forming a horizontal field in the LCD according to the second embodiment of the invention.

FIG. 10 is a graph illustrating the transmittance at sectional surfaces of a pixel electrode and a common electrode forming a horizontal field in the LCD according to the second embodiment. It can be understood from the graph that, compared to the flat structure D without the grooves at the passivation layer 220 disposed under the common electrode 250 and the pixel electrode 240 alternately arranged in the related art pixel region, the structure E with the grooves improves the transmittance.

The above TFT substrate structure and the fabricating method are applicable to any structure forming the horizontal field.

As described above, the transmittance can be increased by forming grooves by etching the passivation layer 220 between the electrodes by a predetermined depth without a dedicated increase of voltage or structural change. Accordingly, the same transmittance can be achieved by low-voltage driving. Consequently, the power consumption can be reduced.

According to an embodiment of the invention, grooves are formed by etching passivation layers among electrodes formed on the passivation layer to a predetermined depth without increasing the voltage or changing the structure, thereby improving the transmittance. Also, since the same transmittance can be obtained with a lower voltage, power consumption can be reduced.

It will be apparent to those skilled in the art that various modifications and variations can be made in the embodiments of the invention without departing from the spirit or scope of the invention. Thus, it is intended that the invention covers the modifications and variations of the embodiments provided they come within the scope of the appended claims and their equivalents.

What is claimed is:

1. A liquid crystal display device, comprising:

a gate line on a substrate;

a data line defining a pixel region by crossing the gate line;

a thin film transistor formed at a crossing position between the gate line and the data line; a passivation layer protecting the thin film transistor;

a pixel electrode connected with the thin film transistor; a common electrode generating an electric field with the pixel electrode; and a plurality of grooves on the passivation layer, wherein at least one of the pixel electrode and the common electrode is arranged at intervals in the pixel region, and the grooves are formed at intervals on the passivation layer disposed between the at least one of the pixel electrode and the common electrode arranged at intervals in the pixel region, wherein a difference between a height of the passivation layer with the grooves between the common electrodes or the pixel electrodes and a height of the passivation layer without the grooves is in a range of about 0.1 μm to 0.7 μm.

2. The liquid crystal display device according to claim 1, wherein the common electrode and the pixel electrode generate a fringe field.

3. The liquid crystal display device according to claim 1, wherein the common electrode and the pixel electrode generate a horizontal field.

4. A method for fabricating a liquid crystal display device, comprising:

forming a gate line and a data line defining a pixel region by crossing each other on a substrate;

forming a thin film transistor at the crossing position between the gate line and the data line;

forming a passivation layer on the substrate including the TFT so as to protect the thin film transistor;

forming a pixel electrode in connection with the thin film transistor;

forming a common electrode to generate an electric field with the pixel electrode; and forming a plurality grooves on the passivation layer, wherein at least one of the pixel electrode and the common electrode is arranged at intervals in the pixel region, and the plurality of grooves are formed at intervals on the passivation layer disposed between the at least one of the pixel electrode and the common electrode arranged at intervals in the pixel region, wherein a difference between a height of the passivation layer formed with the grooves between the common electrodes and the pixel electrodes, and a height of the passivation layer without the grooves is in a range of about 0.1 μm to about 0.7 μm.

5. The fabricating method according to claim 4, wherein the common electrode and the pixel electrode generate a fringe field.

6. The fabricating method according to claim 4, wherein the common electrode and the pixel electrode generate a horizontal field.

* * * * *